United States Patent
Kim et al.

(10) Patent No.: US 9,651,833 B2
(45) Date of Patent: May 16, 2017

(54) LIQUID CRYSTAL DISPLAY DEVICE

(71) Applicant: Samsung Display Co., Ltd., Yongin, Gyeonggi-Do (KR)

(72) Inventors: Su Jeong Kim, Seoul (KR); Jong Ho Son, Seoul (KR); Ki Chul Shin, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 114 days.

(21) Appl. No.: 14/645,318

(22) Filed: Mar. 11, 2015

(65) Prior Publication Data

US 2016/0103371 A1    Apr. 14, 2016

(30) Foreign Application Priority Data

Oct. 8, 2014    (KR) .................. 10-2014-0136003

(51) Int. Cl.
*G02F 1/1343*    (2006.01)
*G02F 1/1337*    (2006.01)

(52) U.S. Cl.
CPC ...... *G02F 1/134309* (2013.01); *G02F 1/1343* (2013.01); *G02F 1/133707* (2013.01); *G02F 2001/134372* (2013.01)

(58) Field of Classification Search
CPC ... G02F 1/134309; G02F 2001/134372; G02F 1/1343; G02F 2001/136218; G02F 1/13394
See application file for complete search history.

(56) References Cited

U.S. PATENT DOCUMENTS

| | | | |
|---|---|---|---|
| 7,683,998 B2 | 3/2010 | Lee | |
| 7,855,772 B2 | 12/2010 | Wang et al. | |
| 8,456,599 B2 | 6/2013 | Jeong et al. | |
| 2003/0197819 A1* | 10/2003 | Sunohara | G02F 1/133707 349/113 |
| 2012/0162589 A1 | 6/2012 | Yoso et al. | |
| 2013/0194536 A1 | 8/2013 | Tae et al. | |

FOREIGN PATENT DOCUMENTS

JP    4131798 B2    6/2008
KR    10-2005-0023084 B1    2/2007

* cited by examiner

*Primary Examiner* — Kendrick Hsu
(74) *Attorney, Agent, or Firm* — Innovation Counsel LLP

(57) ABSTRACT

A liquid crystal display device is provided. The liquid crystal display device includes a first substrate and a pixel electrode disposed on the first substrate, the pixel electrode including a cross stem and a plurality of minute branches extending from the cross stem. The cross stem includes a horizontal stem and a vertical stem crossing the horizontal stem. The liquid crystal display device further includes a second substrate facing the first substrate, a common electrode disposed on the second substrate, and a liquid crystal layer including liquid crystal molecules interposed between the first substrate and the second substrate. Each of the minute branches includes a first side forming an angle of about 45° with the horizontal stem and a second side forming an angle of less than about 45° with the horizontal stem.

15 Claims, 7 Drawing Sheets

LIQUID CRYSTAL DISPLAY DEVICE

CROSS-REFERENCE TO RELATED APPLICATION

This application claims priority to and the benefit of Korean Patent Application No. 10-2014-0136003 filed in the Korean Intellectual Property Office on Oct. 8, 2014, the entire contents of which are incorporated herein by reference.

BACKGROUND (a) Technical Field

The present disclosure relates to a liquid crystal display device.

(b) Description of the Related Art

A liquid crystal display device, which is one of the most common types of flat panel displays currently in use, typically includes two display panels having field generating electrodes (such as a pixel electrode, a common electrode, and the like) and a liquid crystal layer interposed therebetween.

In the liquid crystal display device, an electric field is generated in the liquid crystal layer by applying a voltage to the field generating electrodes. The electric field determines the alignment of liquid crystal molecules of the liquid crystal layer, thereby controlling polarization of incident light passing through the liquid crystal layer so as to display images.

Liquid crystal display devices may be provided in different configurations. In a vertically aligned mode liquid crystal display device, the liquid crystal molecules are aligned such that the long axes of the aligned liquid crystal molecules are perpendicular to the upper and lower display panels when an electric field is not applied. The vertically aligned mode liquid crystal display device is widely used because it has a large contrast ratio and a wide viewing angle.

To implement a wide viewing angle in a vertically aligned mode liquid crystal display device, a plurality of domains having different alignment directions of the liquid crystal may be formed in one pixel.

The plurality of domains may be formed by forming cutouts (such as minute slits) or protrusions on the field generating electrodes, and aligning the liquid crystal in a vertical direction perpendicular to a fringe field using the edges of the cutouts or the protrusions. The fringe field is formed between the field generating electrodes facing the edges of the cutouts or the protrusions.

By aligning the liquid crystal in a vertical direction, the response speed of the liquid crystal is reduced which enables rapid driving of the liquid crystal display device. In particular, high-speed driving of the liquid crystal display device may be achieved by reducing a cell gap corresponding to a thickness of the liquid crystal layer.

However, in some instances, the visibility and transmittance of the liquid crystal display device may deteriorate when the thickness of the liquid crystal layer is reduced.

The above information disclosed in this Background section is only to enhance understanding of the background of the inventive concept and therefore it may contain information that does not form the prior art that is already known in this country to a person of ordinary skill in the art.

SUMMARY

The present disclosure provides a liquid crystal display device having improved visibility and transmittance.

According to an exemplary embodiment of the inventive concept, a liquid crystal display device is provided. The liquid crystal display device includes: a first substrate; a pixel electrode disposed on the first substrate, the pixel electrode including a cross stem and a plurality of minute branches extending from the cross stem, wherein the cross stem includes a horizontal stem and a vertical stem crossing the horizontal stem; a second substrate facing the first substrate; a common electrode disposed on the second substrate; and a liquid crystal layer including liquid crystal molecules interposed between the first substrate and the second substrate, wherein each of the minute branches includes a first side forming an angle of about 45° with the horizontal stem and a second side forming an angle of less than about 45° with the horizontal stem.

In some embodiments, a width of each of the minute branches may decrease with increasing distance from the cross stem.

In some embodiments, the liquid crystal display device may further include a plurality of minute slits disposed between the plurality of minute branches, wherein a ratio of a width of each of the minute slits to the width of each of the minute branches may be equal to or greater than 1/10 and less than 1 at a portion adjacent to the cross stem.

In some embodiments, the first side may be disposed closer to the horizontal stem than the second side.

In some embodiments, an angle between the horizontal stem and the second side may be equal to or greater than about 39°.

In some embodiments, a long axis of the liquid crystal molecules disposed on the second side of each of the minute branches may form an angle of about 45° with the horizontal stem.

In some embodiments, a direction of the long axis of the liquid crystal molecules disposed on the second side of each of the minute branches may be the same as the direction of the long axis of the liquid crystal molecules disposed on a center of each of the minute branches.

In some embodiments, the liquid crystal display device may further include a plurality of minute slits disposed between the plurality of minute branches, wherein a width of each of the minute slits may increase with increasing distance from the cross stem.

In some embodiments, a ratio of the width of each of the minute slits to a width of each of the minute branches may be equal to or greater than 1/10 and less than 1 at a portion adjacent to the cross stem.

In some embodiments, the first side may be disposed closer to the horizontal stem than the second side.

In some embodiments, an angle between the horizontal stem and the second side may be equal to or greater than about 39°.

In some embodiments, the first side may be disposed closer to the horizontal stem than the second side.

In some embodiments, an angle between the horizontal stem and the second side may be equal to or greater than about 39°.

In some embodiments, a long axis of the liquid crystal molecules disposed on the second side of each of the minute branches may form an angle of about 45° with the horizontal stem.

In some embodiments, a direction of the long axis of the liquid crystal molecules disposed on the second side of each of the minute branches may be the same as the direction of the long axis of the liquid crystal molecules disposed on a center of each of the minute branches.

DETAILED DESCRIPTION

Figure 1:
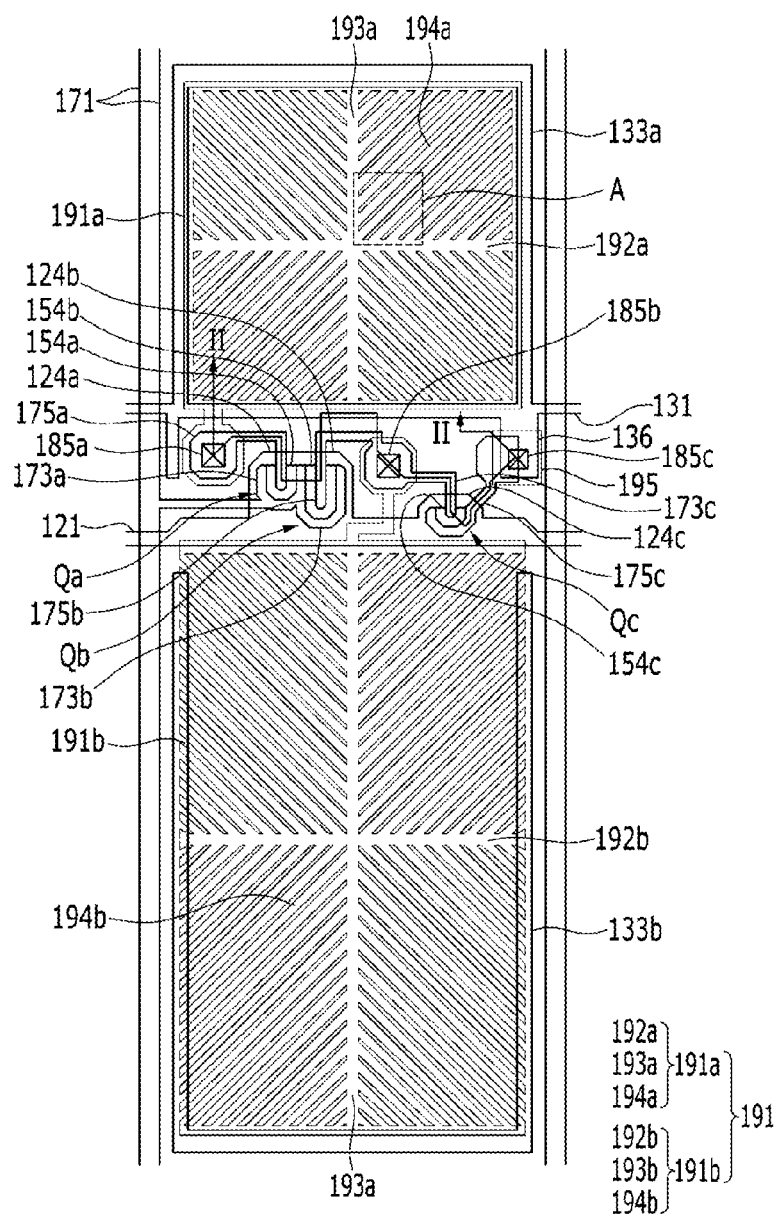
FIG. 1 is a layout view of a liquid crystal display device according to an exemplary embodiment.

The inventive concept will be described more fully herein with reference to the accompanying drawings, in which exemplary embodiments are shown. As those skilled in the art would realize, the embodiments may be modified in various ways without departing from the spirit or scope of the inventive concept.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be disposed directly on the other element or with one or more intervening elements being present. In contrast, when an element is referred to as being "directly on" another element, there are no intervening elements present.

First, a liquid crystal display device according to an exemplary embodiment will be described below with reference to FIGS. 1 to 3.

FIG. 1 is a layout view of a liquid crystal display device according to an exemplary embodiment. FIG. 2 is a cross-sectional view of the liquid crystal display device of FIG. 1 taken along line II-II. FIG. 3 is a magnified view of part A of FIG. 1.

Figure 2:
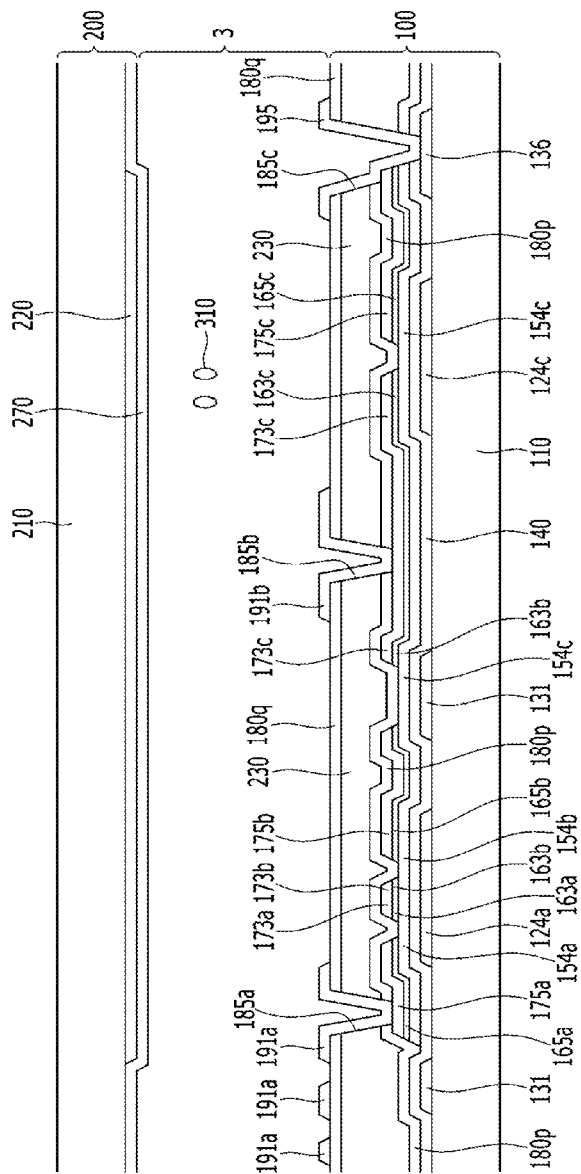
FIG. 2 is a cross-sectional view of the liquid crystal display device of FIG. 1 taken along line II-II.
Figure 3:
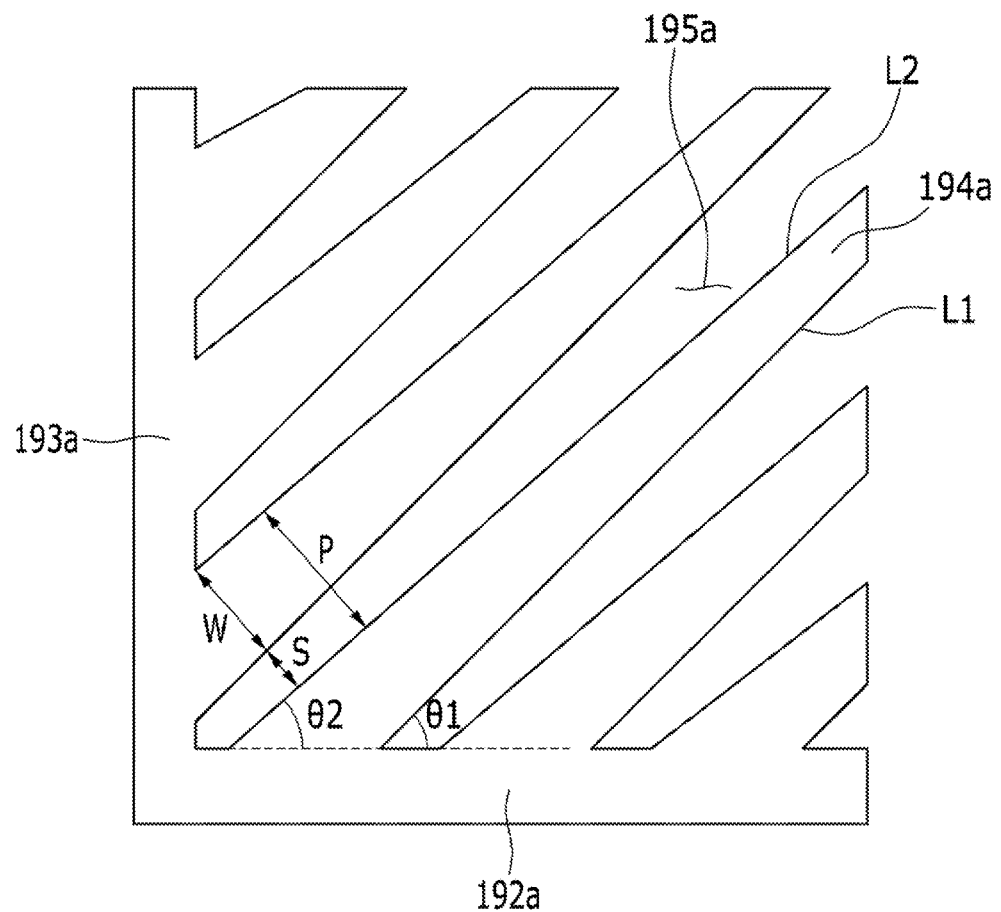
FIG. 3 is a magnified view of part A of FIG. 1.

Referring to FIGS. 1, 2, and 3, the liquid crystal display device includes a lower panel 100 and an upper panel 200 facing each other, and a liquid crystal layer 3 interposed between the panels 100 and 200.

The structure of the lower panel 100 will be described as follows.

A gate line 121 and a reference voltage line 131 are formed on an insulation substrate 110. The insulation substrate 110 may be made of transparent glass or plastic.

The gate line 121 extends in a substantially horizontal direction and transfers a gate signal. The gate line 121 includes a first gate electrode 124a, a second gate electrode 124b, and a third gate electrode 124c.

The reference voltage line 131 extends in a substantially horizontal direction and transfers a predetermined voltage (e.g., a reference voltage). The reference voltage line 131 includes a first storage electrode 133a surrounding a first subpixel electrode 191a and a second storage electrode 133b surrounding a second subpixel electrode 191b. Although not illustrated in FIG. 1, a horizontal portion of the first storage electrode 133a may be formed integrally with a horizontal portion of the second storage electrode 133b of a front pixel. The reference voltage line 131 further includes an extension 136 protruding toward the gate line 121. The extension 136 is connected with a third drain electrode 175c.

A gate insulating layer 140 is formed on the gate line 121, the reference voltage line 131, and the first and second storage electrodes 133a and 133b.

A first semiconductor 154a, a second semiconductor 154b, and a third semiconductor 154c are formed on the gate insulating layer 140. The first/second/third semiconductors 154a/154b/154c may be made of amorphous or crystalline silicon.

A plurality of ohmic contacts 163a, 163b, 163c, 165a, 165b, and 165c are formed on the first semiconductor 154a, the second semiconductor 154b, and the third semiconductor 154c. In some particular embodiments, when the semiconductors 154a, 154b, and 154c are oxide semiconductors, the ohmic contacts 163a, 163b, 163c, 165a, 165b, and 165c may be omitted.

A data line 171 is formed on the ohmic contacts 163a, 165a, 163b, 165b, 163c, and 165c and the gate insulating layer 140. The data line 171 includes a first source electrode 173a and a second source electrode 173b, a first drain electrode 175a, a second drain electrode 175b, a third source electrode 173c, and a third drain electrode 175c. The third drain electrode 175c partially overlaps with the extension 136 of the reference voltage line 131.

The second drain electrode 175b is connected with the third source electrode 173c.

The first gate electrode 124a, the first source electrode 173a, and the first drain electrode 175a, together with a first semiconductor 154a, collectively constitute a first thin film transistor Qa. A channel of the first thin film transistor Qa is formed at the first semiconductor 154a portion between the first source electrode 173a and the first drain electrode 175a.

Similarly, the second gate electrode 124b, the second source electrode 173b, and the second drain electrode 175b, together with the second semiconductor 154b, collectively constitute a second thin film transistor Qb. A channel of the second thin film transistor Qb is formed at the second semiconductor 154b portion between the second source electrode 173b and the second drain electrode 175b.

Likewise, the third gate electrode 124c, the third source electrode 173c, and the third drain electrode 175c, together with the third semiconductor 154c, collectively constitute a third thin film transistor Qc. A channel of the third thin film transistor Qc is formed at the third semiconductor 154c portion between the third source electrode 173c and the third drain electrode 175c.

A passivation layer 180p is formed on the data conductor 171, 173a, 173b, 173c, 175a, 175b, 175c and the exposed portions of the semiconductors 154a, 154b, and 154c. The passivation layer 180p may be made of an inorganic insulating material such as silicon nitride (SiNx) or silicon oxide (SiOx).

A plurality of color filters 230 are disposed on the first passivation layer 180p. The color filters 230 may extend along a column of the pixel electrode 191. Each color filter 230 may display one of the primary colors (such as red, green and blue). However, the color filters 230 are not limited to the three primary colors red, green and blue. In some other embodiments, each of the color filters 230 may display one of cyan, magenta, yellow, and white-based colors.

A second passivation layer 180q is disposed on the color filter 230. The passivation layer 180q may prevent the color filter 230 from lifting off. The passivation layer 180q may also prevent contamination of the liquid crystal layer 3 due to an organic material (such as a solvent) flowing into the liquid crystal layer 3 from the color filter 230, thereby preventing defects (such as an afterimage) from occurring when the display screen is driven.

A first contact hole 185a and a second contact hole 185b are formed in the first passivation layer 180p, the color filter 230, and the second passivation layer 180q, with the first contact hole 185a exposing the first drain electrode 175a and the second contact hole 185b exposing the second drain electrode 175b. The extension 136 of the reference voltage line 131 and a third contact hole 185c are formed in the gate insulating layer 140, the first passivation layer 180p, the color filter 230, and the second passivation layer 180q, with the third contact hole 185c exposing the third drain electrode 175c.

A pixel electrode 191 including a first subpixel electrode 191a and a second subpixel electrode 191b is formed on the second passivation layer 180q. Further, a connection electrode 195 is formed on a same layer as the pixel electrode 191. The connection electrode 195 and the pixel electrode 191 may be formed of a same material. For example, the pixel electrode 191 and the connection electrode 195 may be made of transparent metal oxide such as ITO (Indium Tin Oxide) or IZO (Indium Zinc Oxide).

The first subpixel electrode 191a and the second subpixel electrode 191b are adjacent to each other in a column direction and shaped as a quadrangle. The first subpixel electrode 191a and the second subpixel electrode 191b include cross stems comprising horizontal stems 192a and 192b and vertical stems 193a and 193b crossing the horizontal stems 192a and 192b.

Further, the first subpixel electrode 191a and the second subpixel electrode 191b are divided into four subregions by the horizontal stems 192a and 192b and the vertical stems 193a and 193b, and each subregion includes a plurality of minute branches 194a and 194b.

The minute branches 194a and 194b of the first subpixel electrode 191a and the second subpixel electrode 191b extend obliquely from the horizontal stems 192a and 192b and the vertical stems 193a and 193b. In some embodiments, in one of the four subregions, the minute branches 194a and 194b extend obliquely in an upper left direction from the horizontal stems 192a and 192b or the vertical stems 193a and 193b, and in another subregion, the minute branches 194a and 194b extend obliquely in an upper right direction from the horizontal stems 192a and 192b or the vertical stems 193a and 193b. Further, in another subregion, the minute branches 194a and 194b extend obliquely in a lower left direction from the horizontal stems 192a and 192b or the vertical stems 193a and 193b, and in the other subregion, the minute branches 194a and 194b extend obliquely in a lower right direction from the horizontal stems 192a and 192b or the vertical stems 193a and 193b.

The connection electrode 195 overlaps with the extension 136 of the reference voltage line 131, and overlaps with the third drain electrode 175c. The connection electrode 195 is physically and electrically connected to the extension 136 of the reference voltage line 131 through the third contact hole 185c, and physically and electrically connected to the third drain electrode 175c.

The first subpixel electrode 191a and the second subpixel electrode 191b are physically and electrically connected to the first drain electrode 175a and the second drain electrode 175b through the first contact hole 185a and the second contact hole 185b, respectively, and receive data voltages from the first drain electrode 175a and the second drain electrode 175b, respectively.

In some embodiments, an area of the second subpixel electrode 191b may be one to two times larger than an area of the first subpixel electrode 191a.

Next, referring to FIG. 3, a planar shape of the minute branch 194a will be described in detail. Although only the minute branch 194a of the first subpixel electrode 191a is illustrated in FIG. 3, it should be noted that the minute branch 194b of the second subpixel electrode 191b may also have the same shape.

The minute branch 194a is disposed at a predetermined angle relative to the horizontal stem 192a. The horizontal stem 192a may be formed parallel to the gate line 121. Accordingly, an angle between the minute branch 194a and the horizontal stem 192a may be substantially the same as an angle between the minute branch 194a and the gate line 121.

The minute branch 194a includes a first side L1 and a second side L2. In the example of FIG. 3, the first side L1 and the second side L2 are not parallel to each other. Accordingly, a width w of the minute branch 194a is not constant. For example, the width w of the minute branch 194a may decrease with increasing distance from the horizontal stem 192a and the vertical stem 193a.

In some embodiments, an angle θ1 between the first side L1 of the minute branch 194a and the horizontal stem 192a may be about 45°. The first subpixel electrode 191a includes a plurality of minute branches 194a, and the first side L1 of each minute branch 194a forms an angle of about 45° with the horizontal stem 192a. Further, the first side L1 of the minute branch 194a may form an angle of about 45° with the gate line 121.

In some embodiments, an angle θ2 between the second side L2 of the minute branch 194a and the horizontal stem 192a may be less than about 45°. The first subpixel electrode 191a includes a plurality of minute branches 194a, and the second side L2 of each minute branch 194a forms an angle of less than about 45° with the horizontal stem 192a. Further, the first side L2 of the minute branch 194a may form an angle of less than about 45° with the gate line 121.

The first subpixel electrode 191a includes a plurality of minute branches 194a, and minute slits 195a are disposed between the plurality of minute branches 194a. When the angle θ2 between the second side L2 of the minute branch 194a and the horizontal stem 192a decreases, a distance between adjacent minute branches decreases, and the size of the minute slit 195a also decreases. For example, in one embodiment in which a 55 inch display device has an ultra high definition (UHD) resolution, the angle θ2 between the second side L2 of the minute branch 194a and the horizontal stem 192a may be equal to or greater than about 39° in one pixel.

In some embodiments, a ratio of a width S of the minute slit 195a to the width W of the minute branch 194a may be equal to or greater than 1/10 and less than 1 at a portion adjacent to the cross stems 192a and 193a. A pitch P of the minute branches 194a is determined by a sum of the width W of the minute branch 194a and the width S of the minute slit 195a. In some embodiments, the pitch P of the minute branches 194a may be equal to or greater than 1 μm (for example, about 6 μm).

The pitch P of the minute branches 194a may be constant. However, the width W of the minute branch 194a need not be constant and may decrease with increasing distance from the horizontal stem 192a and the vertical stem 193a. Further, a space between adjacent minute branches 194a, that is, the width S of the minute slit 195a, may increase with increasing distance from the horizontal stem 192a and the vertical stem 193a.

Next, the upper panel 200 will be described.

Referring to FIG. 2, a light blocking member 220 and a common electrode 270 are formed on an insulation substrate 210. The insulation substrate 210 may be made of transparent glass or plastic.

The light blocking member 220 overlaps with the gate line 121, the data line 171, and the first to third thin film transistors Qa, Qb, and Qc. The light blocking member 220 is a black matrix and prevents light leakage.

According to another exemplary embodiment, the light blocking member 220 may be disposed on the lower panel 100. In the above embodiment, a color filter may be disposed on the upper panel 200.

The common electrode 270 may be formed on the surface of the substrate 210, and a constant voltage may be applied to the common electrode 270.

Alignment layers (not illustrated) are formed on inner surfaces of the display panels 100 and 200. The alignment layers may be, for example, vertical alignment layers.

Polarizers (not illustrated) are provided on outer surfaces of the two panels 100 and 200. Transmissive axes of the two polarizers are orthogonal to each other, and one of the transmissive axes may be parallel to the gate line 121. In some embodiments, the polarizers may be disposed on the outer side of any one of the panels 100 and 200.

The liquid crystal layer 3 has negative dielectric anisotropy, and the liquid crystal molecules 310 of the liquid crystal layer 3 are aligned such that the long axes of the liquid crystal molecules 310 are perpendicular to the surfaces of the two panels 100 and 200 when the electric field is not applied. Accordingly, incident light does not pass through an orthogonal polarizer, but is blocked when the electric field is not applied.

At least one of the liquid crystal layer 3 and the alignment layer may include a photo-reactive material, for example, reactive mesogen.

Next, an exemplary method of driving the liquid crystal display device will be described.

When a gate-on signal is applied to the gate line 121, the gate-on signal is applied to the first gate electrode 124a, the second gate electrode 124b, and the third gate electrode 124c, and as a result, the first thin film transistor Qa, the second thin film transistor Qb, and the thin film transistor Qc are turned on. Accordingly, the data voltages applied to the data line 171 are applied to the first subpixel electrode 191a and the second subpixel electrode 191b through the turned-on first thin film transistor Qa and second thin film transistor Qb, respectively. In this case, voltages having the same magnitude are applied to the first subpixel electrode 191a and the second subpixel electrode 191b. However, the voltage applied to the second subpixel electrode 191b is divided through the third thin film transistor Qc which is connected to the second thin film transistor Qb in series. Accordingly, the voltage applied to the second subpixel electrode 191b is lower than the voltage applied to the first subpixel electrode 191a. In the above embodiment, the voltages applied to the first subpixel electrode 191a and the second subpixel electrode 191b are positive (+). In contrast, in another embodiment in which the voltages applied to the first subpixel electrode 191a and the second subpixel electrode 191b are negative (−), the voltage applied to the first subpixel electrode 191a will be lower than the voltage applied to the second subpixel electrode 191b.

Although the case in which one pixel electrode is divided into two subpixel electrodes is described above, the inventive concept is not limited thereto. In some other embodiments, one pixel electrode (i.e., a single pixel electrode) may be divided into three or more subpixel electrodes. Likewise, although the structure in which three thin film transistors are formed in one pixel is described above, it should be noted that the structure may be modified in various ways. For example, in some embodiments, fewer than three or more than three thin film transistors may be formed in one pixel.

Next, transmittance as a function of an azimuthal angle of the liquid crystal molecule and a cell gap will be described with reference to FIGS. 4 and 5.

Figure 4:
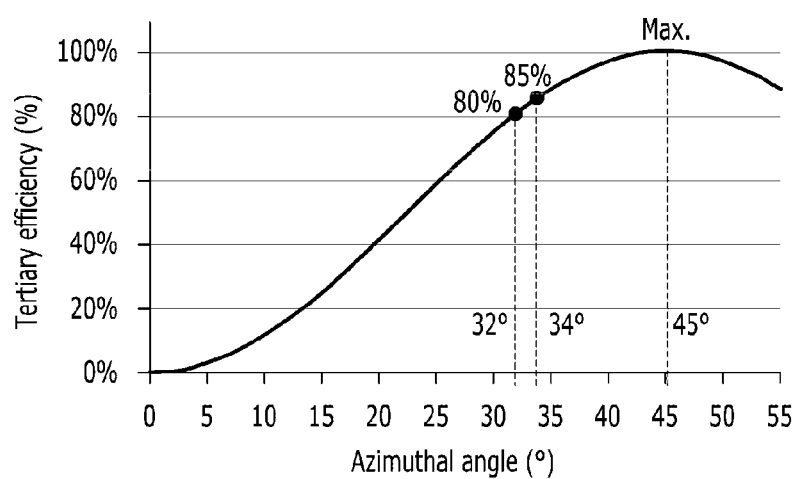
FIG. 4 is a graph illustrating tertiary efficiency of transmittance as a function of an azimuthal angle.
Figure 5:
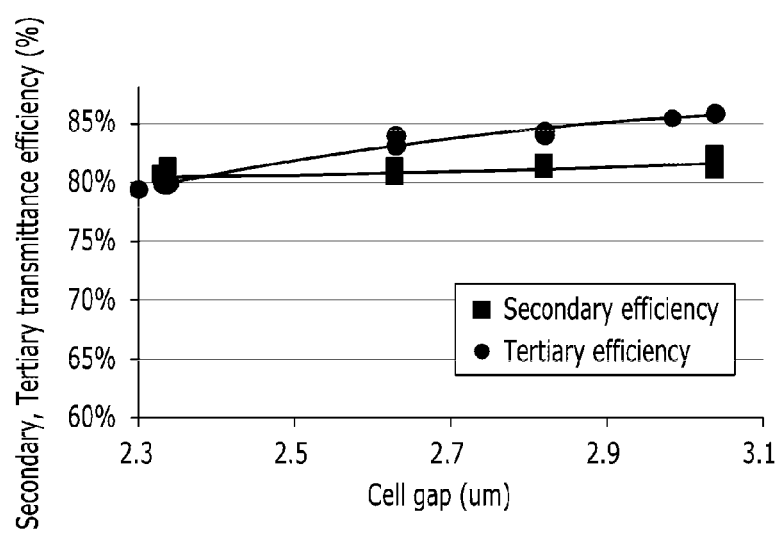
FIG. 5 is a graph illustrating secondary and tertiary efficiencies of transmittance as a function of a cell gap.

FIG. 4 is a graph illustrating tertiary efficiency of transmittance as a function of an azimuthal angle, and FIG. 5 is a graph illustrating secondary and tertiary efficiencies of transmittance as a function of a cell gap.

The transmittance may be calculated by Equation 1.

$$T/T_o = \sin^2\left(\frac{\pi d \times n}{\lambda}\right)\sin^2(2\alpha) \quad \text{Equation 1}$$

where $$\frac{\pi d \times n}{\lambda}$$

is the retardation, a is the azimuthal angle of a liquid crystal molecule, $$\sin^2\left(\frac{\pi d \times n}{\lambda}\right)$$

represents secondary efficiency of transmittance, and $\sin^2(2\alpha)$ represents tertiary efficiency of transmittance.

Referring to Equation 1 and FIG. 4, when a long-axial direction of the liquid crystal molecule is such that the azimuthal angle is 45°, the tertiary efficiency of the transmittance is the highest. As described above, when the electric field is not applied, the long axis of the liquid crystal molecule is aligned such that it is perpendicular to the upper and lower panels. When the data voltage is applied to the pixel electrode to generate an electric field in the liquid crystal layer, the long axis of the liquid crystal molecule is inclined so as to form a predetermined angle with the upper and lower panels. An azimuthal angle of the liquid crystal molecule is defined by the angle between the long axis of the liquid crystal molecule and the horizontal stem or the gate line, as seen from a plan view.

When the azimuthal angle of the liquid crystal molecule decreases or increases with respect to a 45° angle, the tertiary efficiency of the transmittance tends to decrease.

Referring to FIG. 5, as a distance between two display panels of the liquid crystal display device facing each other (i.e., the cell gap) decreases, the tertiary efficiency of the transmittance tends to decrease. For example, when the cell gap is about 3.0 μm, the tertiary efficiency of the transmittance is about 85%, and when the cell gap is about 2.5 μm, the tertiary efficiency of the transmittance is about 80%. Referring to Equation 1 and FIG. 4, when the tertiary efficiency of the transmittance is about 85%, an average azimuthal angle of the liquid crystal molecule is about 34°, and when the tertiary efficiency of the transmittance is about 80%, an average azimuthal angle of the liquid crystal molecule is about 32°. As the cell gap decreases, the tertiary efficiency of the transmittance also decreases because the average azimuthal angle of the liquid crystal molecule decreases.

In an exemplary embodiment, the average azimuthal angle of the liquid crystal molecule may be close to a maximum of 45° so as to increase the tertiary efficiency of the transmittance.

Next, referring to FIGS. 6 and 7, a relationship between a shape of the minute branch and the average azimuthal angle of the liquid crystal molecule in an exemplary liquid crystal display device will be described. In particular, the exemplary liquid crystal display device of FIG. 7 will be compared to a reference structure (FIG. 6) in which the first side and the second side of the minute branch are parallel to each other.

Figure 6:
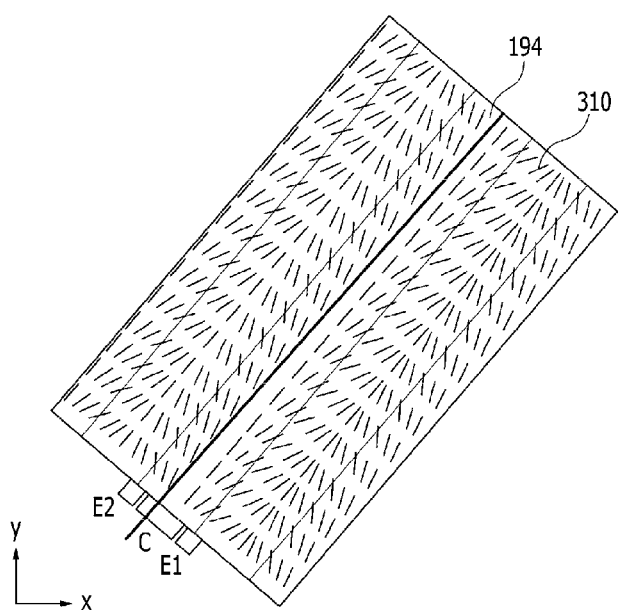
FIG. 6 is a plan view illustrating a minute branch of a liquid crystal display device according to a reference example.

FIG. 6 is a plan view illustrating a minute branch of a liquid crystal display device according to a reference example (the liquid crystal display device having the reference structure). FIG. 7 is a plan view illustrating a minute branch of an exemplary liquid crystal display device. The horizontal stems and the vertical stems have been omitted for clarity, and it may be assumed that the horizontal stems extend in an x-axial direction and the vertical stems extend in a y-axial direction.

As illustrated in FIG. 6, in the liquid crystal display device according to the reference example, the minute branch 194a has a predetermined width, and a distance between adjacent minute branches 194a is uniform. The minute branch 194a forms an angle of about 45° with the x axis (the horizontal stem).

When an electric field is formed in the liquid crystal layer, the liquid crystal molecules 310 are inclined approximately in a direction in which the minute branch 194a extends. Although not illustrated, the minute branches 194a extend in four directions, and the liquid crystal molecules 310 are inclined in four directions approximately along the direction of each minute branch 194a.

In the example of FIG. 6, the liquid crystal molecules 310 disposed on a center C of the minute branch 194a are inclined approximately in a direction parallel to the minute branch 194a so as to have an azimuthal angle of about 45°. However, the liquid crystal molecules 310 disposed on edges E1 and E2 of the minute branch 194a are twisted in another direction by a lateral field and do not have the azimuthal angle of 45°. As a result, the tertiary efficiency of the transmittance is reduced.

For example, the azimuthal angle of the liquid crystal molecule 310 disposed on the first edge E1 of the minute branch 194a may be about 39°, and the azimuthal angle of the liquid crystal molecule 310 disposed on the second edge E2 of the minute branch 194a may be about 51°. As the azimuthal angle of the liquid crystal molecule 310 increases beyond 45°, the transmittance gradually decreases. Further, when the azimuthal angle of the liquid crystal molecule 310 decreases, side visibility may be improved. That is, the transmittance when viewed from the side of the display screen is similar to the transmittance when viewed from the front side. Accordingly, since the azimuthal angle of the liquid crystal molecule 310 disposed on the first edge E1 of the minute branch 194a is less than 45°, the transmittance is reduced compared to the center C of the minute branch 194a and thus the side visibility is improved. Further, since the azimuthal angle of the liquid crystal molecule 310 disposed on the second edge E2 of the minute branch 194a is greater than 45°, the transmittance is reduced compared to the center C of the minute branch 194a and thus the side visibility deteriorates.

Figure 7:
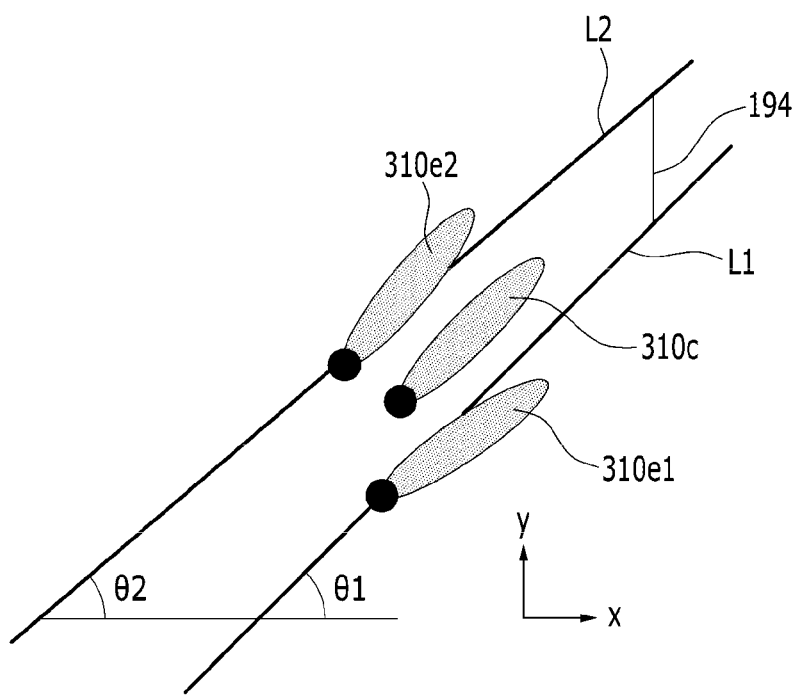
FIG. 7 is a plan view illustrating a minute branch of a liquid crystal display device according to an exemplary embodiment.

In the exemplary liquid crystal display device of FIG. 7, a width of the minute branch 194a decreases with increasing distance from the cross stem. The angle $\theta 1$ between the first side L1 of the minute branch 194a and the x axis (the horizontal stem) is different from the angle $\theta 2$ between the second side L2 of the minute branch 194a and the horizontal stem. The angle $\theta 1$ between the first side L1 of the minute branch 194a and the horizontal stem may be about 45°, and the angle $\theta 2$ between the second side L2 of the minute branch 194a and the horizontal stem may be less than about 45°. For example, in one embodiment, the angle $\theta 2$ between the second side L2 of the minute branch 194a and the horizontal stem may be about 39°.

When an electric field is formed in the liquid crystal layer, the liquid crystal molecules 310 are inclined approximately in a direction in which the minute branch 194a extends. Although not illustrated, the minute branches 194a extend in four directions, and the liquid crystal molecules 310 are inclined approximately in four directions along the direction of each minute branch 194a.

In the embodiment of FIG. 7, a liquid crystal molecule 310c disposed on the center C of the minute branch 194a is inclined approximately in a direction parallel to the minute branch 194a so as to have an azimuthal angle of about 45°. A liquid crystal molecule 310e1 disposed on the first side L1 of the minute branch 194a is twisted in another direction by a lateral field and does not have the azimuthal angle of 45°. However, unlike the reference example of FIG. 6, a liquid crystal molecule 310e2 disposed on the second side L2 of the minute branch 194a in the embodiment of FIG. 7 has an azimuthal angle of about 45°. The angle $\theta 2$ between the second side L2 of the minute branch 194a and the horizontal stem is less than about 45° so as to decrease the lateral field.

Since the azimuthal angle of the liquid crystal molecule 310e2 disposed on the second side L2 of the minute branch 194a in FIG. 7 is reduced by about 6° compared to the reference example in FIG. 6, the embodiment of FIG. 7 therefore has improved visibility and transmittance because its azimuthal angle is closer to 45°. Also, in the exemplary liquid crystal display device, since the angle $\theta 2$ between the second side L2 of the minute branch 194a and the horizontal stem is less than about 45°, side visibility as well as transmittance may be improved.

While the inventive concept has been described in connection with what is presently considered to be exemplary embodiments, it is to be understood that the inventive concept is not limited to the above-described embodiments, but, on the contrary, is intended to cover various modifications and equivalent arrangements included within the spirit and scope of the appended claims.

What is claimed is:
1. A liquid crystal display device, comprising:
a first substrate;
a pixel electrode disposed on the first substrate, the pixel electrode including a cross stem and a plurality of minute branches extending from the cross stem, wherein the cross stem includes a horizontal stem and a vertical stem crossing the horizontal stem;
a second substrate facing the first substrate;
a common electrode disposed on the second substrate; and
a liquid crystal layer including liquid crystal molecules interposed between the first substrate and the second substrate, wherein each of the minute branches includes a first side that forms an angle of about 45° with the horizontal stem and a second side that is opposite to the first side and forms an angle of less than about 45° with the horizontal stem.

2. The liquid crystal display device of claim 1, wherein a width of each of the minute branches decreases with increasing distance from the cross stem.

3. The liquid crystal display device of claim 2, further comprising:
a plurality of minute slits disposed between the plurality of minute branches,
wherein a ratio of a width of each of the minute slits to the width of each of the minute branches is equal to or greater than 1/10 and less than 1 at a portion adjacent to the cross stem.

4. The liquid crystal display device of claim 3, wherein the first side is disposed closer to the horizontal stem than the second side along a direction in which the vertical stem extends.

5. The liquid crystal display device of claim 4, wherein an angle between the horizontal stem and the second side is equal to or greater than about 39°.

6. The liquid crystal display device of claim 5, wherein a long axis of the liquid crystal molecules disposed on the second side of each of the minute branches forms an angle of about 45° with the horizontal stem.

7. The liquid crystal display device of claim 6, wherein a direction of the long axis of the liquid crystal molecules disposed on the second side of each of the minute branches is the same as the direction of the long axis of the liquid crystal molecules disposed on a center of each of the minute branches.

8. The liquid crystal display device of claim 1, further comprising:
a plurality of minute slits disposed between the plurality of minute branches, wherein a width of each of the minute slits increases with increasing distance from the cross stem.

9. The liquid crystal display device of claim 8, wherein a ratio of the width of each of the minute slits to a width of each of the minute branches is equal to or greater than 1/10 and less than 1 at a portion adjacent to the cross stem.

10. The liquid crystal display device of claim 9, wherein the first side is disposed closer to the horizontal stem than the second side along a direction in which the vertical stem extends.

11. The liquid crystal display device of claim 10, wherein an angle between the horizontal stem and the second side is equal to or greater than about 39°.

12. The liquid crystal display device of claim 1, wherein the first side is disposed closer to the horizontal stem than the second side along a direction in which the vertical stem extends.

13. The liquid crystal display device of claim 1, wherein an angle between the horizontal stem and the second side is equal to or greater than about 39°.

14. The liquid crystal display device of claim 1, wherein a long axis of the liquid crystal molecules disposed on the second side of each of the minute branches forms an angle of about 45° with the horizontal stem.

15. The liquid crystal display device of claim 14, wherein a direction of the long axis of the liquid crystal molecules disposed on the second side of each of the minute branches is the same as the direction of the long axis of the liquid crystal molecules disposed on a center of each of the minute branches.

* * * * *